Patented Oct. 4, 1932

1,880,573

UNITED STATES PATENT OFFICE

BRUNO WENDT, OF DESSAU IN ANHALT, AND HANS BINCER, OF DESSAU-ZIEBIGK IN ANHALT, GERMANY, ASSIGNORS TO AGFA ANSCO CORPORATION, OF BINGHAMTON, NEW YORK, A CORPORATION OF NEW YORK

LIGHT-SENSITIVE MATERIAL FOR THE BLEACHING OUT PROCESS

No Drawing. Application filed June 30, 1930, Serial No. 465,059, and in Germany July 30, 1929.

Our present invention relates to the manufacture of light-sensitive materials and more particularly to light-sensitive substances as used in photographic bleaching-out processes and more particularly in the manufacture of photographic prints in natural colors.

Another object of our invention is the new light-sensitive layers obtainable by this process.

Our invention is based on the observation that salts formed by an inorganic or organically substituted acid with an aromatic compound corresponding to the formula

wherein X stands for H, alkyl, benzyl, phenyl or substituted phenyl, R stands for

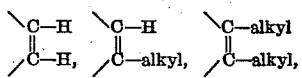

ortho phenylene, ortho naphthylene and substitution products of these radicals bearing an alkyl, hydroxy or methoxy group, z means the radical of an acid, are well suited for use as light-sensitive substances for bleaching-out surfaces. In this formula the aromatic nuclei may be substituted by halogen, the hydroxy, alkoxy, alkyl or carboxylic acid alkyl ester radicle.

As dyes suitable according to our invention we enumerate the following:

3-methyl-6-hydroxy-9-phenylxanthoxonium chloride

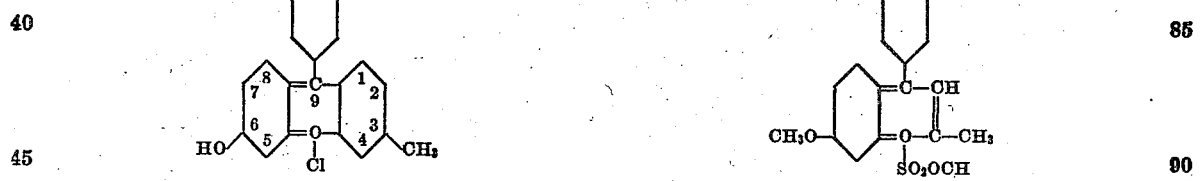

see Journal of the Chemical Society, London, vol. 97, page 1026.

6-hydroxy-9-phenylxanthoxonium chloride

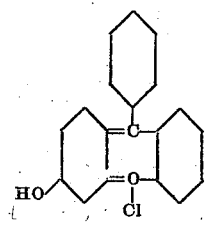

see Journ. of the Chem. Society, London, vol. 99, page 548.

8-hydroxypheno-α-β-naphthoxanthoxonium chloride

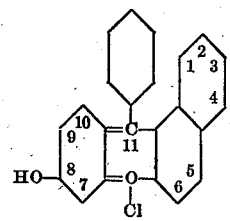

see Journ. of the Chem. Soc., London, vol. 97, page 1026.

1.2.7-trimethyl-4-hydroxybenzopyroxonium chloride

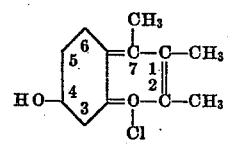

see Berichte der deutschen Chemischen Gesellschaft, vol 36, page 191.

2-methyl-4-methoxy-7-phenylbenzopyroxonium methylsulfonate

see Helvetica Chimica Acta, vol. IX, page 494.

2-methyl-4.5-dihydroxy-7-phenylbenzopyroxonium chloride

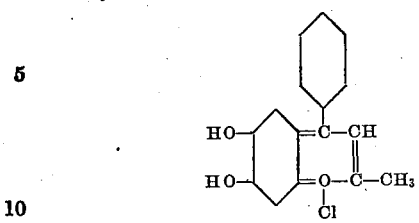

see Helvetica Chimica Acta, vol. IX, page 496.

2-methyl-4.6-dihydroxy-7-phenylbenzopyroxonium chloride

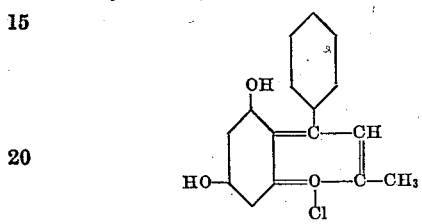

see Berichte der deutschen Chem. Ges., vol. 34, page 1795.

2.7-dihydroxy-9-orthocarbomethoxy-phenyl-xanthoxonium chloride

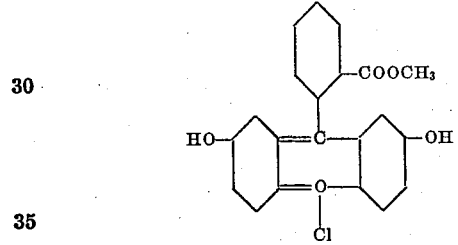

see Berichte der deutschen Chem. Ges., vol. 38, page 1329, and Liebigs Annalen, vol. 372, page 298.

3.6-dihydroxy-9-parachlorophenylxanthoxonium chloride

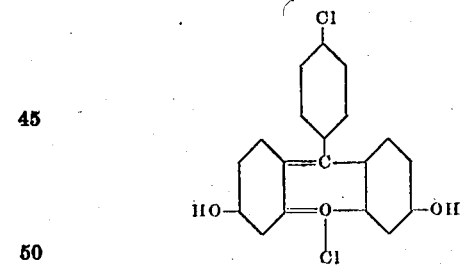

obtainable in an analogous manner as described in Liebigs Annalen, vol. 217, page 234, and Berichte der deutschen Chem. Ges., vol. 42, page 870.

2.7-dihydroxy-3.6-dimethyl-9-phenyl-xanthoxonium chloride

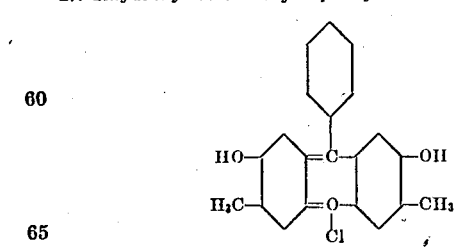

see Liebigs Annalen, vol. 372, page 342.

2.3.6.7.tetramethoxy-9-phenyl-xanthoxonium chloride

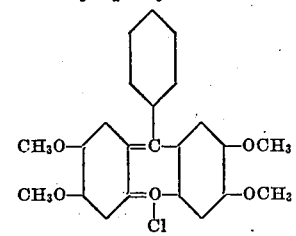

see Ber. der deutschen Chem. Ges., vol. 45, page 2889, and vol. 47, page 3052.

3.6-dihydroxyxanthoxonium chloride

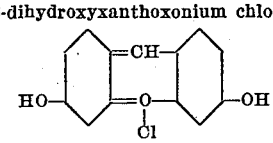

see Liebigs Annalen, vol. 372, page 351.

3.6-dihydroxy-9-methyl-xanthoxonium chloride

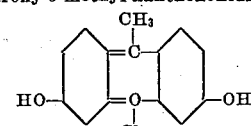

see Liebigs Annalen, vol. 372, page 345 and page 348.

3.6-dihydroxy-9-phenomethyl-xanthoxonium chloride

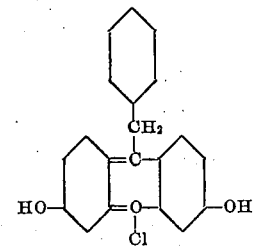

see Journal für praktische Chemie (2) vol. 48, page 398.

3.6-dihydroxy-9-phenylxanthoxonium chloride

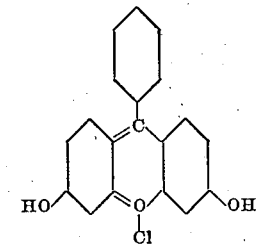

and the ethers thereof. See Liebigs Annalen, vol. 217, page 234 and Berichte der deutschen Chemischen Gesellschaft, vol. 42, page 870.

3.6-dimethoxy-9-orthocarbomethoxy-phenyl-xanthoxonium chloride

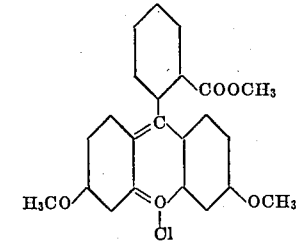

The number of dyes being suitable for our new materials is not exhausted by the foregoing enumeration. Thus, we may use instead of the hydrochloric salts oxonium salts of other acids. Or we may use corresponding compounds substituted in the nucleus or esterified or etherified in the OH groups. As substituent there may be mentioned, for instance, alkyl or aryl residues.

The oxonium dyes of the kind described, generally, have a yellow color and are in the dark very stable when sensitized with one of the usual sensitizers. When exposed to the action of light, they bleach very cleanly and yield pictures with pure white spots.

In preparing light-sensitive materials with the said dyes, we apply to a suitable support such as, for instance, paper or a celluloid film, a preparation containing about 1 to 3 mg. of the dye and 1 gram of a binding agent calculated on 100 square centimeters of the surface of the support. As a binding agent we may use, for instance, gelatin, nitrocellulose, acetyl cellulose or cellulose ethers, or preferably a mixture of such binding agents from which one component dissolves the dye and the other, in which the dye is insoluble, swells in the fixing agent used to remove the sensitizer from the light-sensitive layer. As a sensitizer we may use, for instance, allylthiourea in a quantity of about 0.12 grams, or diethylallylthiourea in a quantity of about 0.06 grams per 100 square centimeters of the light-sensitive surface.

The pictures printed by illuminating the light-sensitive materials described behind a positive, are fixed by washing out the sensitizer from the light-sensitive layer. For this purpose we may use, for instance, water or a diluted alcohol in the case of gelatine used as a binding agent. An extraordinarily good fixation is obtainable by treating the light-sensitive materials with an alkali metal salt or borofluohydric acid, whereat a borofluohydric salt of the oxonium dye is formed which is insoluble in the solvents used for the removal of the sensitizer. Thus, a fading or blurring of the color pictures is avoided.

From the following example serving to illustrate our invention it may be seen how to obtain a bleaching-out layer useful in manufacturing a three-color-picture by a printing process.

*Example.*—A mixture containing 15 grs. of a solution of ethylbenzylcellulose of 5 per cent strength in ethanol and benzene in the ratio 1:1, and 7.5 grs. of a solution of nitrocellulose in ethylether and ethanol mixed in the ratio 3:1 is diluted with 10 ccm. of benzene, 3 ccm. of ethlyether and 12 ccm. of ethanol. To this solution are added 3.5 ccm. of a solution of the yellow dye

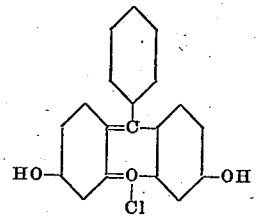

dissolved in ethanol to form a solution of $n/250$ strength 2.5 ccm. of a solution of the purple dye

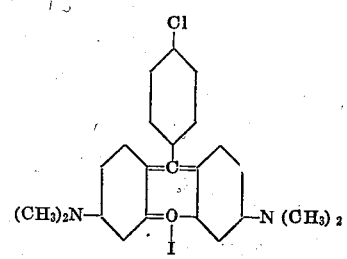

dissolved in ethanol to form likewise a solution of $n/250$ strength, 5 ccm. of the blue-green dye

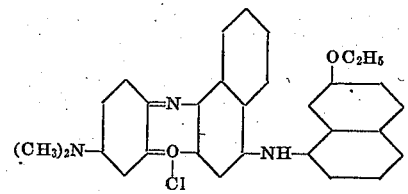

dissolved in ethanol to form a solution of $n/500$ strength and finally 5 cem. of an alcoholic solution of diethylallythiourea of 10 per cent strength. The solution, thus prepared, is poured on 400 sq. cm. of baryta paper and dried.

From the sensitized paper thus obtainable multi-color prints are made by exposing them behind a multi-colored transparency to the action of light. As a transparency we may use, for instance, a screen plate or a multi-color print on paper made transparent, if necessary, by a suitable treatment with oil. Thus, the different colors are printed in one operation. Multicolor pictures are likewise obtainable by exposing the bleaching-out layer described subsequently behind black and white silver-pictures on which the single color-sensations are registered while using simultaneously a correspondingly colored screen. The print obtained is fixed by a treatment with a solvent mixture containing benzine and anisol in the ratio 3:1 removing the sensitizer from the layer.

In the claims following hereafter, we indicate for the sake of clarity the oxonium salts in question as salts formed with the aid of hydrochloric acid. As mentioned above, salts of other inorganic or organically substituted acids show the same behavior and are intended to be covered by the claims as equivalents. The same holds true with regard to homologous compounds having an analogous structure.

What we claim is:

1. Light-sensitive materials for the bleaching-out process containing an oxonium salt of generally yellow color corresponding to the general formula:

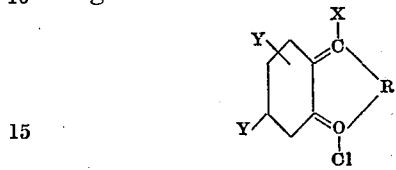

R meaning

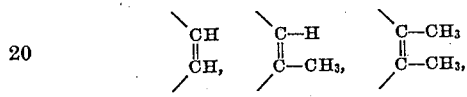

ortho phenylene, ortho naphthylene, and substitution products of these aromatic radicles bearing an alkyl, a hydroxy or methoxy group, X meaning H, methyl, benzyl, phenyl, chlorophenyl, phenylcarboxylic acid methyl ester radicle, Y meaning H, OH, methoxy.

2. Light-sensitive materials for the bleaching-out process containing an oxonium salt of generally yellow color corresponding to the general formula:

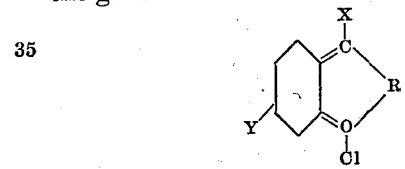

R meaning

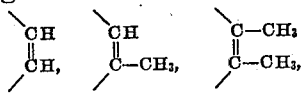

ortho phenylene, ortho naphthylene, and substitution products of these aromatic radicles bearing an alkyl, a hydroxy or methoxy group, X meaning H, methyl, benzyl, phenyl, chlorophenyl, phenylcarboxylic acid methyl ester radicle, Y meaning OH, methoxy.

3. Light-sensitive materials for the bleaching-out process containing an oxonium salt of generally yellow color corresponding to the general formula:

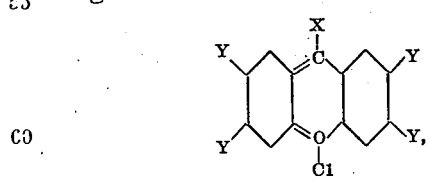

X meaning H, methyl, benzyl, phenyl, chlorophenyl, phenylcarboxylic acid methyl ester radicle, and Y meaning methyl, methoxy.

4. Light-sensitive materials for the bleaching-out process containing an oxonium salt of generally yellow color corresponding to the general formula:

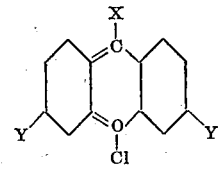

X meaning H, methyl, benzyl, phenyl, chlorophenyl, phenylcarboxylic acid methyl ester radicle, and Y meaning OH, methoxy.

5. Light-sensitive materials for the bleaching-out process containing an oxonium salt of generally yellow color corresponding to the general formula:

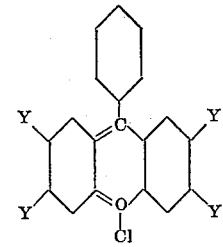

Y meaning H, OH, methyl, methoxy.

6. Light-sensitive materials for the bleaching-out process containing an oxonium salt of generally yellow color corresponding to the general formula:

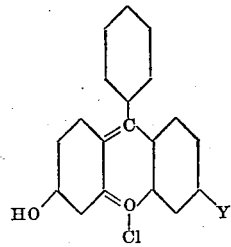

Y meaning H, methyl, OH, methoxy.

7. Light-sensitive materials for the bleaching-out process containing the oxonium salt of yellow color corresponding to the formula:

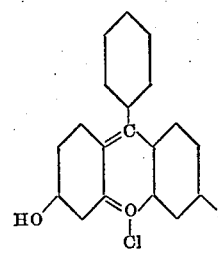
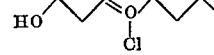

8. Light-sensitive materials for the bleaching-out process containing the oxonium salt of yellow color corresponding to the formula:
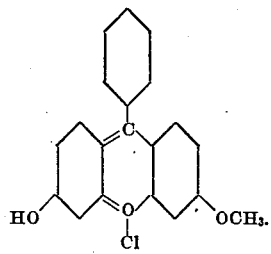
9. Light-sensitive materials for the bleaching-out process containing the oxonium salt of yellow color corresponding to the formula:
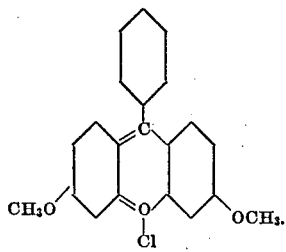
In testimony whereof, we affix our signatures.
BRUNO WENDT.
HANS BINCER.